United States Patent
Kusumoto et al.

(10) Patent No.: US 6,758,781 B2
(45) Date of Patent: Jul. 6, 2004

(54) AUTOMOTIVE AC ROTATING MACHINE

(75) Inventors: Katsuhiko Kusumoto, Tokyo (JP);
Tatsuhiko Mizutani, Tokyo (JP);
Keiichi Konishi, Tokyo (JP); Yutaka Kitamura, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/940,523

(22) Filed: Aug. 29, 2001

(65) Prior Publication Data

US 2002/0025880 A1 Feb. 28, 2002

(30) Foreign Application Priority Data

Aug. 29, 2000 (JP) ...................................... P2000-258696

(51) Int. Cl.[7] .............................. F16H 3/44; F16H 3/72
(52) U.S. Cl. ........................................ 475/13; 475/154
(58) Field of Search .......................... 475/13, 331, 154, 475/159; 192/3.52, 48.92

(56) References Cited

U.S. PATENT DOCUMENTS

| | | | |
|---|---|---|---|
| 4,114,478 A | * 9/1978 | Clauss | 475/144 |
| 4,123,952 A | * 11/1978 | Wayman | 475/144 |
| 4,424,879 A | * 1/1984 | Sonzogni | 180/255 |
| 4,615,227 A | * 10/1986 | Stockton | 475/5 |
| 4,772,247 A | * 9/1988 | Stockton | 475/66 |
| 4,862,009 A | 8/1989 | King | |
| 4,986,801 A | * 1/1991 | Ohlendorf et al. | 123/90.17 |
| 5,266,836 A | 11/1993 | Sousa | |
| 5,378,210 A | * 1/1995 | Teraoka | 475/312 |
| 5,418,400 A | * 5/1995 | Stockton | 290/22 |
| 5,482,512 A | * 1/1996 | Stevenson | 475/5 |
| 5,842,944 A | * 12/1998 | Morishita et al. | 475/154 |
| 6,425,838 B1 | * 7/2002 | Matsubara et al. | 475/13 |
| 6,609,992 B2 | * 8/2003 | Kusumoto et al. | 475/154 |

FOREIGN PATENT DOCUMENTS

| | | | |
|---|---|---|---|
| DE | 43 33 907 A1 | 4/1995 | |
| EP | 0 587 273 A1 | 3/1994 | |
| JP | 11-147424 | 6/1999 | ........... B60K/17/04 |
| WO | 94/12810 A1 | 6/1994 | |

* cited by examiner

Primary Examiner—Charles A. Marmor
Assistant Examiner—Dennis Abdelnour
(74) Attorney, Agent, or Firm—Sughrue Mion, PLLC

(57) ABSTRACT

In a process of assembling a rotating machine, a sun gear 26 which is fixed to an end portion of a rotor shaft 3, and which meshes with a planet gear 31 is configured integrally with a one-way clutch 18 which is disposed inside a carrier 34, and which transmits a rotating force from a pulley 17 to the rotor shaft 3 via the sun gear 26.

4 Claims, 2 Drawing Sheets

AUTOMOTIVE AC ROTATING MACHINE

BACKGROUND OF THE INVENTION

1. Field of the Invention

The present invention relates to an automotive AC rotating machine.

2. Description of the Related Art

FIG. 2 is a section view showing a conventional automotive AC rotating machine (hereinafter, an automotive AC rotating machine is often referred to merely as a rotating machine). Referring to the figure, the rotating machine comprises: a first bracket 51; a Landor type rotor 53 which is disposed in the first bracket 51, and which is fixed to a rotor shaft 52; a stator 54 which is fixed to an inner wall face of the first bracket 51; a slip ring 55 which is fixed to an end portion of the rotor shaft 52 to supply a current to the rotor 53; a pair of brushes 56 which are in sliding contact with the surface of the slip ring 55; and a brush holder 58 which houses the brushes 56 and springs 57 pressing the brushes 56.

The rotor 53 comprises a field winding 59 through which a current flows to generate magnetic fluxes, and a rotor core 60 which covers the field winding 59. The stator 54 comprises a stator core 61 through which the magnetic fluxes from the field winding 59 pass, and in which plural steel plates are stacked, and a three-phase stator winding 62 through which a three-phase current flows.

The rotating machine further comprises an electromagnetic clutch 64 which is disposed in a second bracket 63, a planetary gear mechanism 65, a pulley 66, and a one-way clutch 67.

The electromagnetic clutch 64 comprises: an electromagnetic clutch body 70 which is fixed to the second bracket 63 by fixing means 69 such as a fixing screw 68 and a key; a field coil 71 which is disposed in the electromagnetic clutch body 70; an electromagnetic clutch driven member 75 which is fixed by a fixing screw 73 via a holding member 72 of the first bracket 51, which is opposed to the electromagnetic clutch body 70, and which has an engaging portion 74; and a spring 76 which is disposed between the electromagnetic clutch driven member 75 and the head of the fixing screw 73, and which urges the electromagnetic clutch driven member 75 toward the opposite side of the electromagnetic clutch body 70.

A guide face 72a is formed on the outer peripheral face of the holding member 72. The electromagnetic clutch driven member 75 is attached to the holding member 72 by causing a guide face 75b which is formed on the inner peripheral face of the electromagnetic clutch driven member 75, to axially slide over the guide face 72a. Alternatively, the holding member 72 of the first bracket 51 may be integrally molded instead of being formed as a separate member.

The planetary gear mechanism 65 comprises: a sun gear 77; a cylindrical member 80 in which an engaging portion 78 that is to be engaged with the engaging portion 74 of the electromagnetic clutch driven member 75 is formed in an end face, and an internal gear 79 is formed in the inner wall face; a bearing 81 which is disposed between one end face of the cylindrical member 80 and an end portion of the first bracket 51; a planet gear 82 which meshes with the internal gear 79 and the sun gear 77; a planet gear shaft 84 which is passed through a center portion of the planet gear 82 via a bearing 83; a carrier 85 which rotatably supports the planet gear 82 via the planet gear shaft 84, and which is configured integrally with the pulley 66; and a bearing 86 which is disposed between an end portion of the carrier 85 and that of the cylindrical member 80.

The one-way clutch 67 comprises: a cam portion 87 which is disposed inside the carrier 85; bearings 88 which are disposed respectively on both sides of the cam portion 87; and a driven member 90 which is fixed together with the sun gear 77 to an end portion of the rotor shaft 52 via a fixing key 89.

The reference numerals 91 and 92 denote bearings, 93 and 94 denote spacers, and 95 denotes a fixing bolt.

Next, the operation will be described.

The motor operation of the rotating machine will be first described.

When an engine is to be started, the field coil 71 of the electromagnetic clutch 64 is energized, the electromagnetic clutch driven member 75 is driven against the elastic force of the spring 76 to be joined with the electromagnetic clutch body 70, and the engaging portion 74 of the electromagnetic clutch driven member 75 is engaged with the engaging portion 78 of the cylindrical member 80.

As a result, the internal gear 79 of the cylindrical member 80 functions as a fixed element, so that speed reduction at the reduction ratio of the planetary gear mechanism 65 is enabled. With respect to the rotating force of the rotor 53, the sun gear 77 functions as an input element, and the rotation of the sun gear 77 causes the planet gear 82 to revolve around the sun gear 77 while rotating about the planet gear shaft 84.

In accordance with the revolution of the planet gear 82, the carrier 85 functions as an output element, the pulley 66 which is integrated with the carrier 85 rotates, and the rotating force is transmitted to the engine via a belt (not shown) which is wound around the pulley 66, whereby the engine is started. At this time, the one-way clutch 67 operates idle. Therefore, the engine is driven by a product of the rotational speed of the rotor 53, the reduction ratio of the planetary gear mechanism 65, and that of the pulley 66 and a crank pulley (not shown) of the engine.

The rotating force of the rotor 53 is obtained by supplying an exciting current to the field winding 59 via a battery (not shown), the brushes 56, and the slip ring 55 to generate magnetic fluxes in the rotor core 60, and, in this state, supplying a three-phase current to the three-phase stator winding 62.

Next, the generator operation of the rotating machine will be described.

When an electric power is to be supplied by the generator operation, the energization of the field coil 71 of the electromagnetic clutch 64 is interrupted, so that the electromagnetic clutch driven member 75 is separated from the electromagnetic clutch body 70 by the elastic force of the spring 76 to cancel the engagement of the engaging portion 74 of the electromagnetic clutch driven member 75 and the engaging portion 78 of the cylindrical member 80, thereby enabling the cylindrical member 80 to rotate. Under this state, the power from the engine is transmitted via the pulley 66 to the carrier 85 functioning as an input element. At this time, the one-way clutch 67 performs an engaging action. In accordance with the rotation of the carrier 85, therefore, the rotor 53 is caused to rotate via the rotor shaft 52, and an electromotive force is generated in the three-phase stator winding 62.

Since the conventional automotive AC rotating machine is configured as described above, the planetary gear mechanism 65 is assembled in the following manner. First, the one-way clutch 67 is previously attached to the inside of the carrier 85, and the inner periphery of the bearing 86 is then fitted onto the outer periphery of the carrier 85. Thereafter, the planet gear shaft 84 which holds the planet gear 82 via the bearing 83 is fitted into the carrier 85, whereby a sub assembly is configured. The sub assembly and all must be pressingly inserted along the outer periphery of the bearing 86 into the inner periphery of the cylindrical member 80. Therefore, the rotating machine has a problem in that it is very difficult to assemble the machine.

In the pressing fitting process, furthermore, the outer race of the bearing 86 is press-inserted into the inner periphery of the cylindrical member 80 by pressing the inner ring of the bearing 86. This produces another problem in that an impression is produced in a shoulder portion of a race surface in the bearing 86.

SUMMARY OF THE INVENTION

The invention has been conducted in order to solve the problems discussed above. It is an object of the invention to provide an automotive AC rotating machine which can be easily assembled, and in which it is possible to avoid occurrence of a failure and a damage of a part during the assembling process.

The automotive AC rotating machine according to a first aspect of the invention comprises: a rotor which is fixed to a rotor shaft disposed in a bracket; a sun gear which is fixed to an end portion of said rotor shaft; a planet gear which meshes with said sun gear; a cylindrical member having an internal gear which meshes with said planet gear; a carrier which rotatably supports said planet gear via a planet gear shaft that axially passes through a center portion of said planet gear; a one-way clutch which is disposed in said carrier and which transmits a rotating force from a power transmission mechanism to said rotor shaft via said sun gear; and an electromagnetic clutch which is disposed in said bracket, wherein said one-way clutch and said sun gear are configured integrally with each other.

In the automotive AC rotating machine according to a second aspect of the invention, said power transmission mechanism, said one-way clutch, and said sun gear are configured integrally with each other as a sub assembly, and said planet gear and said carrier are configured integrally with each other as a sub assembly.

In the automotive AC rotating machine according to a third aspect of the invention, said carrier and said power transmission mechanism are to be connected to each other, said carrier and said power transmission mechanism are subjected to radial positioning by coaxially fitting an outer periphery of one end portion of said power transmission mechanism and an inner periphery of said carrier.

In the automotive AC rotating machine according to a fourth aspect of the invention, said carrier and said power transmission mechanism are connected to each other by coupling means such as a screw.

In the automotive AC rotating machine according to a fifth aspect of the invention, said carrier and said power transmission mechanism are integrally fitted and coupled to each other by a pin.

In the automotive AC rotating machine according to a sixth aspect of the invention, said carrier and said cylindrical member configure a labyrinth.

DETAILED DESCRIPTION OF THE PREFERRED EMBODIMENTS

A description will be given in more detail of preferred embodiments of the invention with reference to the accompanying drawings. Embodiment 1.

Figure 1:
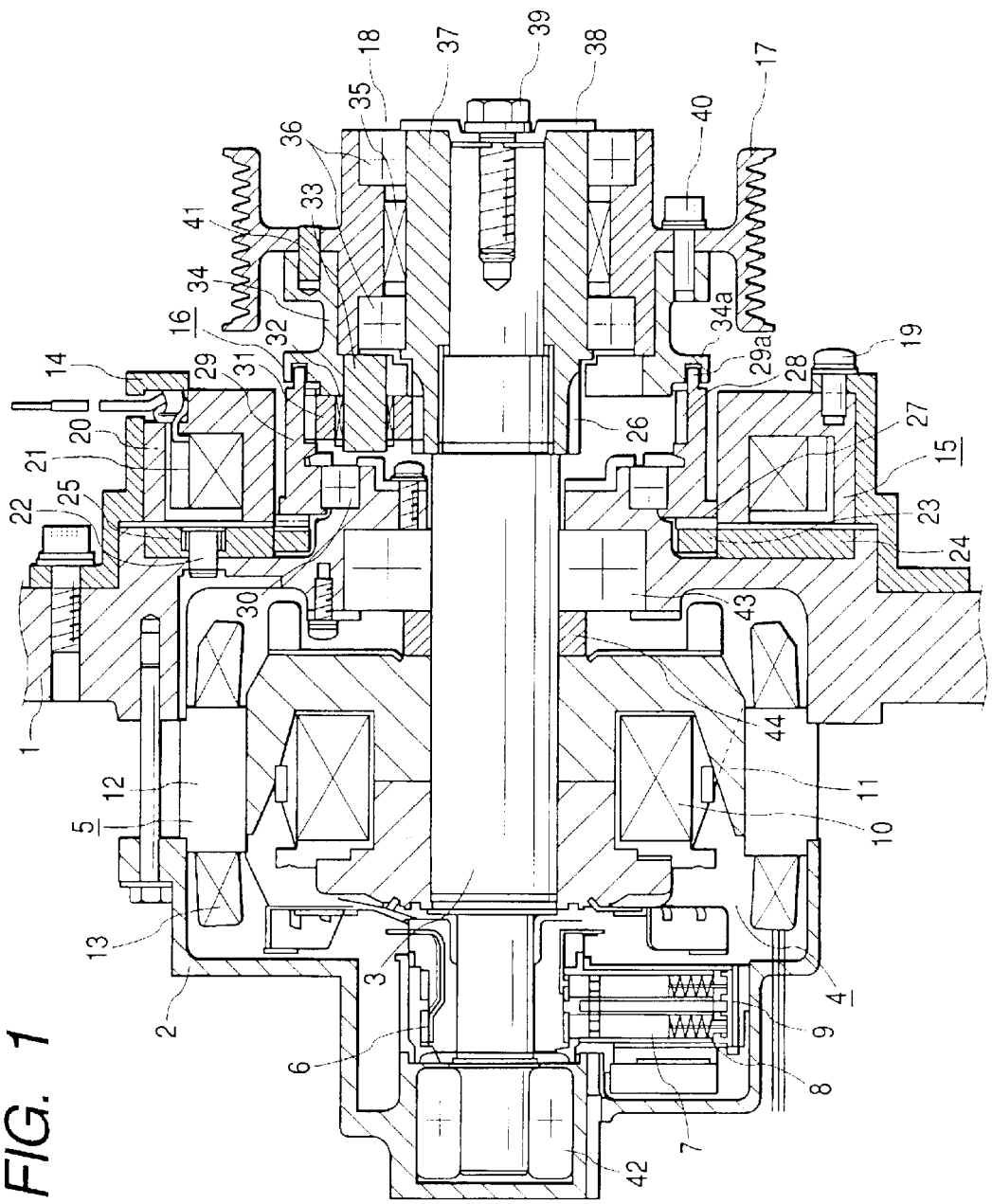
FIG. 1 is a section view showing an automotive AC rotating machine of Embodiment 1 of the invention.
Figure 2:
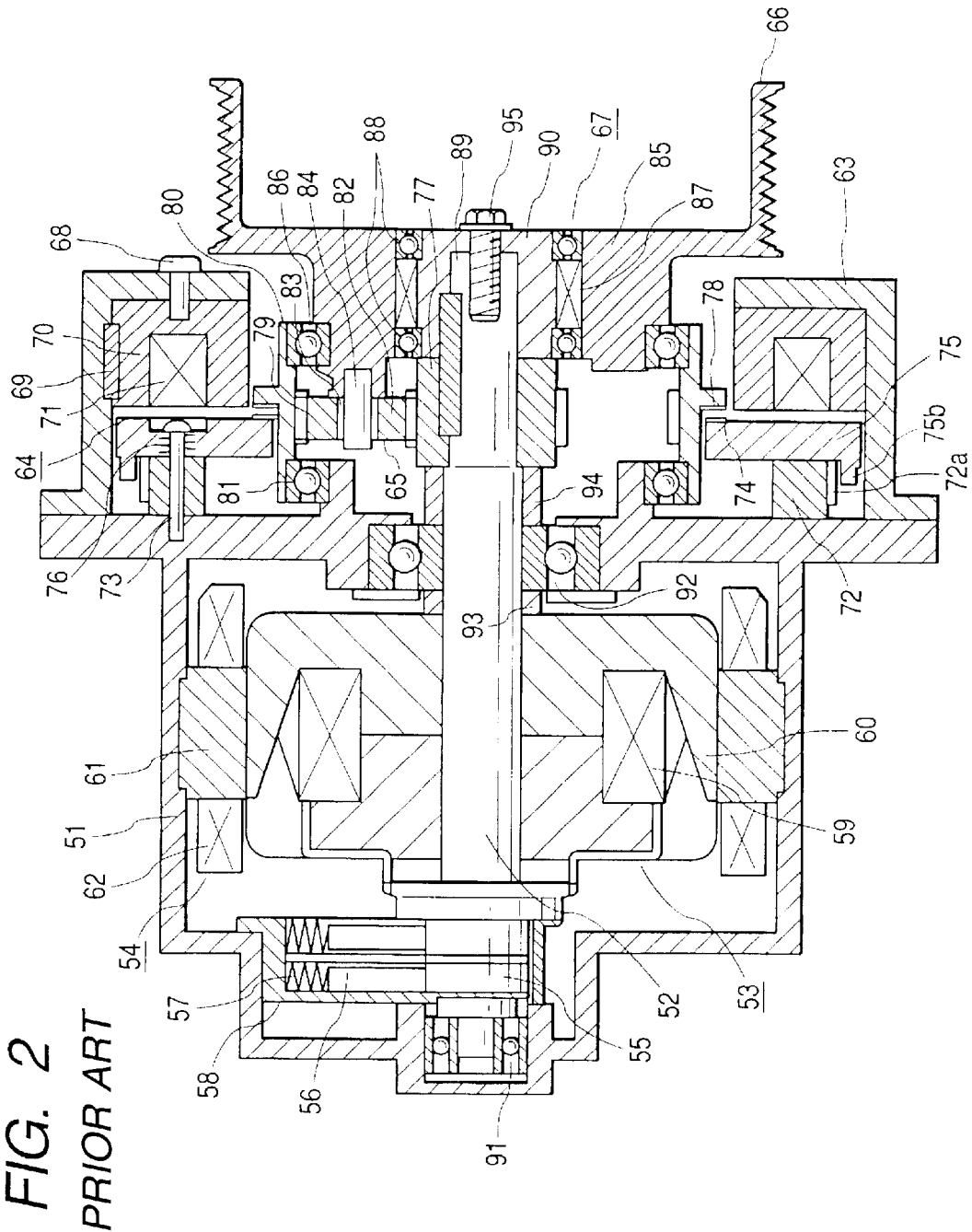
FIG. 2 is a section view showing a conventional automotive AC rotating machine.

FIG. 1 is a section view showing an automotive AC rotating machine of Embodiment 1 of the invention. Referring to the figure, the rotating machine comprises: a first bracket 1; a third bracket 2; a Landor type rotor 4 which is disposed in the first and third brackets 1 and 2, and which is fixed to a rotor shaft 3; a stator 5 which is fixed to inner wall faces of the first and third brackets 1 and 2; a slip ring 6 which is fixed to an end portion of the rotor shaft 3 to supply a current to the rotor 4; a pair of brushes 7 which are in sliding contact with the surface of the slip ring 6; and a brush holder 9 which houses the brushes 7 and springs 8 pressing the brushes 7.

The rotor 4 comprises a field winding 10 through which a current flows to generate magnetic fluxes, and a rotor core 11 which covers the field winding 10. The stator 5 comprises a stator core 12 through which the magnetic fluxes from the field winding 10 pass, and in which plural steel plates are stacked, and a three-phase stator winding 13 through which a three-phase current flows.

The rotating machine further comprises an electromagnetic clutch 15 which is disposed in a second bracket 14, a planetary gear mechanism 16, a pulley 17, and a one-way clutch 18.

The electromagnetic clutch 15 comprises: an electromagnetic clutch body 20 which is fixed to the second bracket 14 by a fixing screw 19; a field coil 21 which is disposed in the electromagnetic clutch body 20; an electromagnetic clutch driven member 24 which is fixed to the first bracket 1 by fixing means 22, which is opposed to the electromagnetic clutch body 20, and which has an engaging portion 23; and a spring 25 which is disposed between the electromagnetic clutch driven member 24 and the head of the fixing means 22, and which urges the electromagnetic clutch driven member 24 toward the opposite side of the electromagnetic clutch body 20.

The planetary gear mechanism 16 comprises: a sun gear 26; a cylindrical member 29 in which an engaging portion 27 that is to be engaged with the engaging portion 23 of the electromagnetic clutch driven member 24 is formed in an end face, and an internal gear 28 is formed in the inner wall face; a bearing 30 which is disposed between one end face of the cylindrical member 29 and an end portion of the first bracket 1; a planet gear 31 which meshes with the internal gear 28 and the sun gear 26; a planet gear shaft 33 which is passed through a center portion of the planet gear 31 via a bearing 32; and a carrier 34 which rotatably supports the planet gear 31 via the planet gear shaft 33. Labyrinths 29a and 34a are formed between an end portion of the carrier 34 and that of the cylindrical member 29. In place of the labyrinths, an oil seal may be configured in the portion.

Since the labyrinths 29a and 34a are configured by the carrier 34 and the cylindrical member 29 as described above, a lubricating material for the planetary gear mechanism 16 is prevented from flowing out to the outside, and salt water, dusts, and the like are prevented from infiltrating from the outside. As a result, noises or the like due to rust of the tooth surface and deterioration of the lubricating material can be prevented from being produced.

The one-way clutch 18 comprises: a cam portion 35 which is disposed inside the pulley 17; bearings 36 which are disposed respectively on both sides of the cam portion 35; and a driven member 37 which is fixed integrally with the sun gear 26 to an end portion of the rotor shaft 3. The one-way clutch 18 which is configured integrally with the sun gear 26 and the pulley 17 is insertingly fitted to an end portion of the rotor shaft 3, and fixed to the rotor shaft 3 via a plate 38 by a fixing bolt 39.

Since the one-way clutch 18 and the sun gear 26 are integrally configured as described above, the coaxiality between the one-way clutch 18 and the sun gear 26 can be accurately ensured, and an assembly error in an assembling process can be avoided. In the planetary gear mechanism 16, therefore, partial wear of the tooth surface, and production of noises can be suppressed.

Moreover, parts such as a key for connecting the sun gear 26 to the one-way clutch 18 can be omitted.

The pulley 17 and the carrier 34 are subjected to radial positioning by coaxially fitting the outer periphery of one end portion of the pulley 17 and the inner periphery of the carrier 34, and integrally coupled and fixed to each other by coupling means 40 and a pin 41. The reference numerals 42 and 43 denote bearings, and 44 denotes a spacer.

As described above, the carrier 34 and the pulley 17 which serves as a power transmission mechanism are connected to each other by the coupling means 40 such as a screw. Therefore, the following is enabled. The planet gear 31 is attached to the carrier 34 via the planet gear shaft 33 and the bearing 32, whereby a sub assembly is configured. Similarly, the one-way clutch 18 is attached to the pulley 17 to configure another sub assembly. Thereafter, the carrier 34 and the pulley 17 can be connected to each other by the coupling means 40, so that these sub assemblies can be integrated with each other. Consequently, the rotating machine can be easily assembled, and an assembly error and a damage of a part in an assembling process can be avoided.

When the carrier 34 and the pulley 17 are to be connected to each other by the coupling means 40, the carrier 34 and the pulley 17 are integrally fitted and coupled to each other by the pin 41 in advance.

Since the carrier 34 and the pulley 17 are integrally fitted and coupled to each other in advance by the pin 41 in addition to the coupling means 40, also the pin 41 shares the torque transmission between the carrier 34 and the pulley 17, so that stress due to the torque transmission can be dispersed and reduced.

When the carrier 34 and the pulley 17 are to be connected to each other by the coupling means 40, the outer periphery of one end portion of the pulley 17 and the inner periphery of the carrier 34 are coaxially fitted to each other to be radially positioned. Therefore, the positional accuracy of the planet gear 31 which is connected to the carrier 34 via the planet gear shaft 33 and the bearing 32, with respect to the sun gear 26 can be ensured, so that partial wear of the tooth surface, and production of noises in the planetary gear mechanism 16 can be reduced.

The pulley 17, the one-way clutch 18, and the sun gear 26 are integrally configured as a sub assembly, and the planet gear shaft 33, the planet gear 31 which is disposed via the bearing 32, and the carrier 34 are integrally configured as another sub assembly. Since the components are configured as sub assemblies, the rotating machine can be easily assembled, and the assembly accuracy and the reliability are improved.

Next, the operation of the rotating machine will be described.

The motor operation of the rotating machine will be first described.

When an engine is to be started, the field coil 21 of the electromagnetic clutch 15 is energized, the electromagnetic clutch driven member 24 is driven against the elastic force of the spring 25 to be joined with the electromagnetic clutch body 20, and the engaging portion 23 of the electromagnetic clutch driven member 24 is engaged with the engaging portion 27 of the cylindrical member 29.

As a result, the internal gear 28 of the cylindrical member 29 functions as a fixed element, so that speed reduction at the reduction ratio of the planetary gear mechanism 16 is enabled. With respect to the rotating force of the rotor 4, the sun gear 26 functions as an input element, and the rotation of the sun gear 26 causes the planet gear 31 to revolve around the sun gear 26 while rotating about the planet gear shaft 33.

In accordance with the revolution of the planet gear 31, the carrier 34 functions as an output element, the pulley 17 which is integrally coupled and fixed to the carrier 34 rotates, and the rotating force is transmitted to the engine via a belt (not shown) which is wound around the pulley 17, whereby the engine is started. At this time, the one-way clutch 18 operates idle. Therefore, the engine is driven by a product of the rotational speed of the rotor 4, the reduction ratio of the planetary gear mechanism 16, and that of the pulley 17 and a crank pulley (not shown) of the engine.

The rotating force of the rotor 4 is obtained by supplying an exciting current to the field winding 10 via a battery (not shown), the brushes 7, and the slip ring 6 to generate magnetic fluxes in the rotor core 11, and, in this state, supplying a three-phase current to the three-phase stator winding 13.

Next, the generator operation of the rotating machine will be described.

When an electric power is to be supplied by the generator operation, the energization of the field coil 21 of the electromagnetic clutch 15 is interrupted, so that the electromagnetic clutch driven member 24 is separated from the electromagnetic clutch body 20 by the elastic force of the spring 25 to cancel the engagement of the engaging portion 23 of the electromagnetic clutch driven member 24 and the engaging portion 27 of the cylindrical member 29, thereby enabling the cylindrical member 29 to rotate.

Under this state, the power from the engine is transmitted via the pulley 17 to the carrier 34 functioning as an input element. At the same time, the one-way clutch 18 performs an engaging action. In accordance with the rotation of the pulley 17, therefore, the rotor 4 is caused to rotate via the one-way clutch 18, the sun gear 26, and the rotor shaft 3, and an electromotive force is generated in the three-phase stator winding 13.

The automotive AC rotating machine of the first aspect of the invention comprises: a rotor which is fixed to a rotor shaft disposed in a bracket; a sun gear which is fixed to an end portion of said rotor shaft; a planet gear which meshes with said sun gear; a cylindrical member having an internal gear which meshes with said planet gear; a carrier which rotatably supports said planet gear via a planet gear shaft that axially passes through a center portion of said planet gear; a one-way clutch which is disposed in said carrier and which transmits a rotating force from a power transmission mechanism to said rotor shaft via said sun gear; and an electromagnetic clutch which is disposed in said bracket. The one-way clutch and said sun gear are configured integrally with each other. Consequently, the coaxiality between the one-way clutch and the sun gear can be accurately ensured, and an assembly error in an assembling process can be avoided. In the planetary gear mechanism, therefore, partial wear of the tooth surface, and production of noises can be suppressed.

Moreover, parts such as a key for connecting the sun gear to the one-way clutch can be omitted.

According to the automotive AC rotating machine of the second aspect of the invention, said power transmission mechanism, said one-way clutch, and said sun gear are configured integrally with each other as a sub assembly, and said planet gear and said carrier are configured integrally with each other as a sub assembly. Since the components are configured as sub assemblies, the rotating machine can be easily assembled, and the assembly accuracy and the reliability are improved.

According to the automotive AC rotating machine of the third aspect of the invention, when said carrier and said power transmission mechanism are to be connected to each other, said carrier and said power transmission mechanism are subjected to radial positioning by coaxially fitting an outer periphery of one end portion of said power transmission mechanism and an inner periphery of said carrier. Therefore, the positional accuracy of the planet gear which is connected to the carrier via the planet gear shaft and the bearing, with respect to the sun gear can be ensured, so that partial wear of the tooth surface, and production of noises in the planetary gear mechanism can be reduced.

According to the automotive AC rotating machine of the fourth aspect of the invention, said carrier and said power transmission mechanism are connected to each other by coupling means such as a screw. Therefore, the planet gear is attached to the carrier via the planet gear shaft and the bearing, whereby a sub assembly is configured. Similarly, the one-way clutch is attached to the pulley to configure another sub assembly. Thereafter, the carrier and the power transmission mechanism can be connected to each other by the coupling means, so that these sub assemblies can be integrated with each other. Consequently, the rotating machine can be easily assembled, and an assembly error and a damage of a part in an assembling process can be avoided.

According to the automotive AC rotating machine of the fifth aspect of the invention, said carrier and said power transmission mechanism are integrally fitted and coupled to each other by a pin. Therefore, also the pin shares the torque transmission between the carrier and the power transmission mechanism, so that stress due to the torque transmission can be dispersed and reduced.

According to the automotive AC rotating machine of the sixth aspect of the invention, said carrier and said cylindrical member configure a labyrinth. Therefore, a lubricating material for the planetary gear mechanism is prevented from flowing out to the outside, and salt water, dusts, and the like are prevented from infiltrating from the outside. As a result, noises or the like due to rust of the tooth surface and deterioration of the lubricating material can be prevented from being produced.

What is claimed is:

1. An automotive AC rotating machine comprising:
   a rotor which is fixed to a rotor shaft disposed in a bracket;
   a sun gear which is fixed to an end portion of said rotor shaft;
   a planet gear which meshes with said sun gear;
   a cylindrical member having an internal gear which meshes with said planet gear;
   a carrier which rotatably supports said planet gear via a planet gear shaft that axially passes through a center portion of said planet gear;
   a one-way clutch which is disposed in said carrier and which transmits a rotating force from a power transmission mechanism to said rotor shaft via said sun gear; and
   an electromagnetic clutch which is disposed in said bracket,
   wherein said one-way clutch and said sun gear are configured integrally with each other,
   wherein an inner periphery of a bearing is not fitted on an outer periphery of the carrier,
   wherein said power transmission mechanism, said one-way clutch, and said sun gear are configured integrally with each other as a sub assembly, and said planet gear and said carrier are configured integrally with each other as a sub assembly, and
   wherein, when said carrier and said power transmission mechanism are to be connected to each other, said carrier and said power transmission mechanism are subjected to radial positioning by coaxially fitting an outer periphery of one end portion of said power transmission mechanism and an inner periphery of said carrier.

2. An automotive AC rotating machine comprising:
   a rotor which is fixed to a rotor shaft disposed in a bracket;
   a sun gear which is fixed to an end portion of said rotor shaft;
   a planet gear which meshes with said sun gear;
   a cylindrical member having an internal gear which meshes with said planet gear;
   a carrier which rotatably supports said planet gear via a planet gear shaft that axially passes through a center portion of said planet gear; and
   a one-way clutch which is disposed in said carrier and which transmits a rotating force from a power transmission mechanism to said rotor shaft via said sun gear; and
   an electromagnetic clutch which is disposed in said bracket;
   wherein said one-way clutch and said sun gear are configured integrally with each other, and
   wherein said carrier and said power transmission mechanism are connected to each other by a coupling member.

3. An automotive AC rotating machine according to claim 2, wherein said carrier and said power transmission mechanism are integrally fitted and coupled to each other by a pin.

4. An automotive AC rotating machine comprising:
   a rotor which is fixed to a rotor shaft disposed in a bracket;
   a sun gear which is fixed to an end portion of said rotor shaft;
   a planet gear which meshes with said sun gear;
   a cylindrical member having an internal gear which meshes with said planet gear;
   a carrier which rotatably supports said planet gear via a planet gear shaft that axially passes through a center portion of said planet gear; and
   a one-way clutch which is disposed in said carrier and which transmits a rotating force from a power transmission mechanism to said rotor shaft via said sun gear; and an electromagnetic clutch which is disposed in said bracket;

wherein said one-way clutch and said sun gear are configured integrally with each other, and wherein said carrier and said cylindrical member configure a labyrinth.

* * * * *